US008703338B2

(12) United States Patent
Patoux et al.

(10) Patent No.: US 8,703,338 B2
(45) Date of Patent: Apr. 22, 2014

(54) MATERIAL BASED ON CARBON AND SILICON NANOTUBES THAT CAN BE USED IN NEGATIVE ELECTRODES FOR LITHIUM BATTERIES

(75) Inventors: Sébastien Patoux, Fontaine (FR); Frederic Le Cras, Notre Dame De L'Osier (FR)

(73) Assignee: Commissariat a l'Energie Atomique, Paris (FR)

( * ) Notice: Subject to any disclaimer, the term of this patent is extended or adjusted under 35 U.S.C. 154(b) by 317 days.

(21) Appl. No.: 12/158,798

(22) PCT Filed: Dec. 21, 2006

(86) PCT No.: PCT/EP2006/070121
§ 371 (c)(1),
(2), (4) Date: Jun. 23, 2008

(87) PCT Pub. No.: WO2007/071778
PCT Pub. Date: Jun. 28, 2007

(65) Prior Publication Data
US 2008/0280207 A1 Nov. 13, 2008

(30) Foreign Application Priority Data
Dec. 23, 2005 (FR) ...................................... 05 13261

(51) Int. Cl.
*H01M 4/133* (2010.01)
*H01M 4/134* (2010.01)
*H01M 4/583* (2010.01)
*H01M 10/0525* (2010.01)
*H01M 4/1393* (2010.01)
*H01M 4/1395* (2010.01)

(52) U.S. Cl.
USPC .................... 429/231.8; 429/218.1

(58) Field of Classification Search
CPC ... H01M 4/133; H01M 4/134; H01M 4/1393; H01M 4/1395; H01M 4/386; H01M 4/583; H01M 4/587
USPC ........................ 429/231.8, 209, 212–231.9; 423/324–350, 447.1–447.9; 977/788–789, 813–814
See application file for complete search history.

(56) References Cited

U.S. PATENT DOCUMENTS

| 6,129,901 | A | * | 10/2000 | Moskovits et al. | ........ 423/447.3 |
| 2002/0001905 | A1 | * | 1/2002 | Choi et al. | ..................... 438/268 |
| 2002/0020053 | A1 | * | 2/2002 | Fonash et al. | ................ 29/623.1 |
| 2002/0084410 | A1 | * | 7/2002 | Colbert et al. | ................ 250/306 |
| 2002/0182495 | A1 | * | 12/2002 | Ogura et al. | ............... 429/218.1 |
| 2003/0003364 | A1 | | 1/2003 | Mori et al. | |
| 2003/0099883 | A1 | | 5/2003 | Ochoa et al. | |
| 2003/0129497 | A1 | | 7/2003 | Yamamoto et al. | |
| 2003/0215715 | A1 | * | 11/2003 | Barker et al. | .................. 429/232 |
| 2004/0106203 | A1 | * | 6/2004 | Stasiak et al. | ................... 436/49 |
| 2004/0126659 | A1 | * | 7/2004 | Graetz et al. | ............... 429/218.1 |
| 2004/0131937 | A1 | | 7/2004 | Chen et al. | |
| 2004/0234844 | A1 | | 11/2004 | Morris et al. | |
| 2006/0166098 | A1 | * | 7/2006 | Tabuchi et al. | ................ 429/232 |
| 2006/0204853 | A1 | | 9/2006 | Chen | |

FOREIGN PATENT DOCUMENTS

| WO | WO 03/096449 | * 11/2003 | ............ H01M 10/40 |
| WO | 2004 037714 | 5/2004 | |
| WO | 2005 022666 | 3/2005 | |

OTHER PUBLICATIONS

Seeger et al. "Nanotube composites: novel SiO2 coated carbon nanotubes." Chemical Communications. 2002, 34-35. (Dec. 2001).*
Li, H. et al., "The Crystal Structural Evolution of Nano-Si Anode Caused by Lithium Insertion and Extraction At Room Temperature", Solid State Ionics, vol. 135, No. 1-4, pp. 181-191 (2000).
Kabir, M. S. et al., "Plasma-Enhanced Chemical Vapour Deposition Growth of Carbon Nanotubes on Different Metal Underlayers", Nanotechnology, vol. 16, No. 4, pp. 458-466 (2005).
Seeger, T. et al., "SiOx-Coating of Carbon Nanotubes At Room Temperature", Chemical Physics Letters, vol. 339, No. 1-2, pp. 41-46 (2001).
Whitsitt, E. A. et al., "Silica Coated Single Walled Carbon Nanotubes", Nano Letters, vol. 3, No. 6, pp. 775-778 (2003).
Enculescu. Digest Journal of Nanomaterials and Biostructures, (2006), vol. 1, No. 1, p. 15-20.
From Nanowires to Nanotubes, http://www.physorg.com/news78677878.html accessed May 21, 2010.
Bonsor et al, How Nanotechnology Works, http://www.howstuffworks.com/nanotechnology2.htm accessed May 21, 2010.

* cited by examiner

*Primary Examiner* — Jonathan Crepeau
*Assistant Examiner* — Jacob Buchanan
(74) *Attorney, Agent, or Firm* — Oblon, Spivak, McClelland, Maier & Neustadt, L.L.P.

(57) ABSTRACT

The invention relates to a material comprising carbon nanotubes, deposited at the surface of each of which is a substantially continuous film of nanoscale silicon particles, that can be used in negative electrodes for a lithium battery.

13 Claims, No Drawings

MATERIAL BASED ON CARBON AND SILICON NANOTUBES THAT CAN BE USED IN NEGATIVE ELECTRODES FOR LITHIUM BATTERIES

TECHNICAL FIELD

The present invention relates to a novel material based on carbon nanotubes and silicon.

The present invention also relates to a negative electrode comprising such a material intended to be incorporated into a lithium battery.

The general field of the invention may be defined as that of lithium batteries.

Lithium batteries are increasingly used as a self-contained energy source, in particular in portable electronic equipment (such as mobile telephones, laptop computers, tools, etc.), where they are gradually replacing nickel-cadmium (NiCd) and nickel-metal hydride (NiMH) batteries. They are also widely used to provide the energy supply necessary for new microapplications, such as chip cards, sensors or other electromechanical systems.

Commercial lithium batteries of the lithium ion type usually have a nominal voltage of 3.7 V, an extremely low self-discharge and currently allow the storage of around 160-180 Wh/kg and 420-500 Wh/kg in an extended operating temperature range (−20° C. to +65° C.).

These lithium batteries operate on the principle of injection-extraction (or intercalation-deintercalation) of lithium according to the following principle.

During the discharge of the battery, the lithium extracted from the negative electrode in ionic form $Li^+$ migrates through the ion-conductive electrolyte and is intercalated in the crystalline network of the active material of the positive electrode. The passage of each $Li^+$ ion in the internal circuit of the battery is exactly compensated for by the passage of an electron in the external circuit, thus generating an electric current. The energy density by weight released by these reactions is both proportional to the potential difference between the two electrodes and to the amount of lithium which will be intercalated in the active material of the positive electrode.

During charging of the battery, the reactions that take place within the battery are reactions that are the reverse of the discharge, namely that:
  the negative electrode will insert lithium into the crystalline network of the material forming it; and
  the positive electrode will release lithium.

Due to this operating principle, the lithium batteries require two different insertion compounds at the negative electrode and at the positive electrode.

The positive electrode is generally based on a lithiated transition metal oxide:
  of the type: lamellar oxide of formula $LiMO_2$, where M denotes Co, Ni, Mn, Al and mixtures of these, such as $LiCoO_2$, $LiNiO_2$, $Li(Ni, Co,Mn,Al)O_2$; or
  of the type: oxide of spinel structure, such as $LiMn_2O_4$.

The negative electrode may be based on a carbon-based material, and in particular based on graphite.

Graphite has a theoretical specific capacity of around 372 mAh/g (corresponding to the formation of the $LiC_6$ alloy) and a practical specific capacity of around 320 mAh/g. However, graphite has a high irreversibility during the first charge, a continuous loss of capacity during cycling and a prohibitory kinetic limitation in the case of a high charge/discharge rate (for example for a C/2 charge rate).

With a view to improving the insertion properties of lithium into the negative electrode, researchers have centred their efforts on the research of novel electrode materials.

Thus, they have discovered that materials or components capable of forming an alloy with lithium are able to form excellent alternatives to the use of graphite.

It is in this way that it has been demonstrated that the use of silicon in a negative electrode made it possible to significantly increase the specific capacity of the negative electrode linked to the insertion of lithium into the latter, which is 320 mAh/g for a graphite electrode and 3578 mAh/g for a silicon-based electrode (corresponding to the formation of the $Li_{15}Si_4$ alloy during the insertion of lithium into the silicon at ambient temperature). Thus, by means of simple predictions, it is possible to envisage a gain of around 40 and 35%, respectively in energy per unit volume and in energy per unit weight, if graphite is substituted with silicon in a conventional battery of the "lithium ion" type. Furthermore, the operating voltage window of the lithium-silicon alloy of formula $Li_{15}Si_4$ (0.4-0.05 V/Li—$Li^+$) being higher than that of graphite makes it possible to avoid the formation of a metallic lithium deposit and the associated risks, while allowing the possibility of carrying out charging more rapidly. Furthermore, it is established that the reaction for formation of the lithium-silicon alloy, resulting in a very high capacity (of around 3578 mAh/g), is reversible.

Nevertheless, the use of silicon in a negative electrode of a lithium battery poses a certain number of problems.

In particular, during the reaction for formation of the silicon-lithium alloy (corresponding to the insertion of lithium in the negative electrode during the charging process), the volume expansion between the delithiated phase and the lithiated phase may reach 280%. This high expansion, followed by a contraction of the same amplitude (corresponding to the extraction of lithium from the negative electrode during the discharging process) rapidly leads to irreversible mechanical damage of the electrode and eventually to a loss of contact between the negative electrode and the underlying current collector. It causes a rapid loss of the capacity during cycling.

Furthermore, although having advantageous lithium insertion properties, silicon cannot be used as is due to its low electrical conductivity, which has the effect of kinetically limiting the use of the battery.

The researchers have set themselves the objective of providing silicon-based negative electrode materials that at least partly overcome these drawbacks.

Thus, proposed in US 2003/0129497 is a silicon-based negative electrode covered with a film of amorphous carbon or of diamond-type carbon. In this document, the carbon film acts as protection against the formation of dendrites (which cause short circuits) and against the degradation of the electrode. This film therefore covers the device and during the reaction the insertion of lithium will be carried out, firstly, in the carbon as in a conventional electrode without the silicon properties.

The inventors have set themselves the objective of producing a novel material that can be used in a negative electrode for a lithium battery, which makes it possible to overcome the drawbacks of the materials used in the prior art, namely:
  the problems of mechanical degradation linked to the expansion/contraction phenomenon resulting from the insertion/extraction of lithium; and
  the problems of electrical conductivity.

SUMMARY OF THE INVENTION

Thus, the invention relates to a material comprising carbon nanotubes, deposited at the surface of each of which is a film of nanoscale silicon particles.

The materials of the invention have the following advantages:
- carbon nanotubes have a satisfactory electronic conductivity which makes it possible to improve the electrochemical performances of the material incorporating them;
- carbon nanotubes have good elastic deformability, which makes it possible to absorb the volume expansion of the silicon film when lithium is inserted into it;
- it is possible to control the amount of carbon nanotubes within the material, so as to conserve enough empty spaces to receive the deformations linked to the insertion-extraction phenomenon of lithium, when this material is intended to be used in lithium batteries; and
- the fact that the silicon is deposited in the form of films on the surface of the carbon nanotubes helps to increase (for example, by a factor of 1000) the active silicon surface compared to the case where the carbon-based part and the silicon part were in the form of two separate superposed layers, which allows the insertion of a larger amount of lithium.

The film of nanoscale silicon particles advantageously has a thickness ranging from 1 to 50 nm and is advantageously a single layer and is substantially continuous.

The expression "substantially continuous film" is generally understood to mean a film that forms a sheath around each of the carbon nanotubes.

The nanoscale silicon particles generally have a particle size ranging from 1 to 50 nm.

Advantageously, the nanotubes are positioned substantially parallel to one another.

Generally, the carbon nanotubes are attached to a substrate via one of their ends, preferably substantially perpendicular relative to this substrate.

This substrate is advantageously electrically conductive.

From a practical point of view, this material may be produced by a process that successively comprises the following steps:
- a step of growing carbon nanotubes; and
- a step of depositing a film of nanoscale silicon particles on the surface of these nanotubes.

Generally, the step of growing the carbon nanotubes is carried out on a substrate, preferably an electrically conductive substrate. It may therefore be a metallic substrate, for example made of copper, titanium or nickel.

The carbon nanotubes may be prepared according to various methods, among which mention may be made of:
- high-temperature processes using an energy source chosen from a laser or electric arc and by using a carbon-based target; and
- medium-temperature processes, based on the decomposition of a hydrocarbon-based gas over a metallic catalyst.

For the high-temperature processes, the energy source (electric arc or laser ablation) is used to vaporize a component mainly composed of carbon, such as graphite, commonly called a target. The high energy concentration generated by the source makes it possible to locally raise the temperature, in the vicinity of the target, to above 3000° C. From the moment the target is vaporized, a plasma is created that contains carbon particles of atomic dimensions. These particles react together within the plasma to form carbon nanotubes.

For the medium-temperature processes based on the decomposition of a hydrocarbon-based gas over a metallic catalyst, mention may more particularly be made of conventional CVD (Chemical Vapour Deposition) processes that preferably take place in a fluidized bed. The hydrocarbon-based gas may be acetylene, xylene, methane, ethylene or propylene. Under particular pressure and temperature conditions, the gas coming into contact with the metallic catalyst particles decomposes and the carbon particles react together to form carbon nanotubes, from the site of the metallic catalyst particles. The metallic catalyst particles may be based on Ni, Co or Fe and are deposited onto the substrate, for example made of silicon, silica, copper, titanium or nickel, optionally covered with a barrier layer (for example, made of titanium nitride or silica) to prevent diffusion of the catalyst into the substrate. Preferably, the substrate is made from a metallic element chosen from copper, titanium and nickel. These metallic catalyst particles are preferably positioned, according to a predetermined arrangement, as a function of the envisaged amount of carbon nanotubes and the space desired between the carbon nanotubes. In order to control the deposition of the metallic catalyst particles onto the substrate, it may be envisaged, prior to the deposition of these particles, to physically or chemically mask, according to the principle of photolithography, the parts of the substrate that are desired to be free of carbon nanotubes at the end of the process.

On the other hand, if a precise organization of the metallic catalyst particles at the surface of the substrate is not necessary, it is possible to deposit the latter by sputtering.

Generally, the reaction temperature does not exceed 900° C.

Once the nanotubes have been synthesized, it may be envisaged to carry out a step of removing the catalyst(s) so that it (they) do(es) not interact with the lithium when this material will be used in a negative electrode for a lithium battery. The removal of the metallic catalyst particles may be carried out by chemical attack using nitric acid followed, in some cases, by a heat treatment at high temperature (for example, from 700° C. to 2000° C.) in order to remove the remaining catalyst particles, and similarly possible surface impurities.

It may also be envisaged to remove the substrate, especially when it is made from a non-metallic material.

The medium-temperature processes based on the use of catalyst particles are particularly advantageous for the implementation of the invention, in so far as they allow a selectivity in the arrangement of the carbon nanotubes, by altering the layout of the metallic catalyst particles on the substrate, the growth of nanotubes only taking place from the site of these particles. It is thus possible to control the porosity of the material of the invention by altering the amount of metallic catalyst particles and their layout.

Following the formation of the carbon nanotubes, a film of nanoscale silicon particles is deposited at the surface of the carbon nanotubes.

This deposition may be carried out, for example, by chemical vapour deposition (CVD) starting from silylated precursors, such as the silane $SiH_4$, which makes it possible to obtain a uniform distribution of the silicon, which thus forms a sheath around each nanotube.

According to this embodiment, the silicon is thus deposited starting from gaseous precursors which react on a support, which is heated so as to provide the activation energy necessary for initiating the chemical reaction between the support and the gaseous silylated precursors.

In this case, according to the invention, the support is composed of carbon nanotubes and the gaseous silylated precursors may be silanes ($SiH_4$) or chlorosilane compounds. The temperature to which the carbon nanotubes are brought generally ranges from 300 to 600° C.

In contact with the carbon nanotubes, the gaseous silylated precursors, for example of the silane type, decompose according to the following reaction scheme:

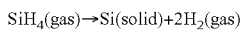

$$SiH_4(gas) \rightarrow Si(solid) + 2H_2(gas)$$

The deposition parameters will advantageously be determined so as to obtain a silicon film having a thickness below 50 nm, which substantially corresponds to the deposition of a few single layers of nanoscale silicon particles over the outer walls of the carbon nanotubes.

The deposition of the silicon film may also be carried out in solution. For example, an electrodeposition may be carried out starting from $SiCl_4$ in an ionic liquid medium.

Due to their intrinsic properties, these materials may be used effectively in the negative electrodes of lithium batteries.

Thus, one subject of the invention is an electrode comprising a material such as defined above. This electrode may be a negative electrode for a lithium battery.

Advantageously, this material is in the form of carbon nanotubes positioned substantially parallel to one another and substantially perpendicular relative to an electrically conductive substrate, for example one made of copper, nickel or titanium, this electrically conductive support acting as a negative electrode current collector.

The use of the materials of the invention to form negative electrodes for a lithium battery has a large number of advantages.

Specifically, the electrochemical performances of the silicon, especially its cyclability, are improved when it is deposited in the form of films of nanoscale particles on carbon nanotubes. Such an improvement stems from the ability of the nanotubes to be reversibly deformed during the lithium insertion-extraction phenomena in the silicon film, which thus limits the electrode decay phenomena usually encountered with the negative electrodes of the prior art.

It has especially been demonstrated, following molecular dynamics, that the maximum (reversible) angle of curvature of the carbon nanotubes, defined as the smallest angle between the tangents to the two ends of the curved tube, may reach 110°, reversibly. The carbon nanotubes are therefore quite capable of withstanding the deformations generated by the lithium insertion-extraction phenomenon.

Moreover, the carbon nanotubes have an extremely high mechanical strength (Young's modulus of around 1 TPa and a tensile strength of around 50 GPa). This strength, combined with the ability to be reversibly deformed and with their high conductivity, makes carbon nanotubes the most ideal material possible for the films of nanoscale silicon particles on the negative electrode of lithium batteries.

Furthermore, such an electrode makes it possible to achieve a specific capacity of around 3600 mAh/g, owing to the formation of the silicon-lithium alloy $Li_{1.5}Si_4$, which corresponds to the incorporation of up to 79% lithium atoms in the alloy, the insertion capacities in the silicon being improved by the simple fact of depositing the latter in the form of a film of nanoscale particles on the carbon nanotubes.

In addition, the carbon nanotubes have a high electrical conductivity compared to that of graphite.

The negative electrodes based on the material of the invention thus have excellent properties in terms of energy density (specific capacity and potential) and of power (ability to respond to high current densities), while being capable of carrying out several hundreds of charge/discharge cycles at elevated rates, with a low loss of capacity per cycle.

The material may be in bulk form in the negative electrode or else in the form of a dispersion in a matrix comprising an electrically conductive additive and/or an organic binder.

As an electrically conductive additive, mention may be made of carbon in a form other than the carbon nanotubes.

As an organic binder, mention may be made of polymers such as a polyether, a polyester, a polymer based on methyl methacrylate, a polymer based on acrylonitrile, and a polymer based on vinylidene fluoride.

Finally, the invention relates to a lithium battery comprising at least one negative electrode such as defined above. More particularly, the lithium battery belongs to the "lithium ion" type, that is to say that the lithium is never in the battery in metallic form but goes back and forth between the two lithium insertion compounds contained in the positive and negative electrodes at each charging and discharging of the battery.

The lithium battery of the invention conventionally comprises at least one electrochemical cell comprising:
  a negative electrode such as defined above;
  a positive electrode; and
  a separator placed between said negative electrode and said positive electrode, which separator comprises a lithium-ion conductive electrolyte.

The positive electrode may comprise a material chosen from lithiated transition metal phosphates, lithiated transition metal oxides and mixtures of these.

As examples of lithiated phosphates that can be used, mention may be made of $LiFe_{x_1}Mn_{1-x_1}PO_4$ with $0 \leq x_1 \leq 1$.

These materials have an olivine type structure.

As examples of lithiated transition metal oxides, mention may be made of lamellar oxides $Li(Co, Ni, Mn, Al)O_2$ and oxides of spinel structure of the type $Li_{1+x}Mn_2O_4$ where $0 \leq x_1 \leq 0.1$.

The separator may be in the form of a porous component containing a lithium-ion conductive liquid electrolyte.

The porous component may be in the form of a polymer, for example made of polyethylene or of polypropylene or a combination of the two.

The liquid electrolyte comprises, for example, an aprotic liquid solvent, for example of the carbonated type, such as ethylene carbonate, propylene carbonate, dimethyl carbonate or diethyl carbonate, a solvent or blend of solvents of the ether type, such as dimethoxyethane, dioxolane or dioxane, in which a lithium salt is dissolved.

As examples, the lithium salt may be chosen from the group composed of $LiPF_6$, $LiClO_4$, $LiBF_4$, $LiAsF_6$, $LiCF_3SO_3$, $LiN(CF_3SO_2)_3$, $LiN(C_2F_5SO_2)$.

The invention claimed is:

1. A lithium battery comprising at least one electrochemical cell comprising:
  a negative electrode comprising a material comprising carbon nanotubes, wherein a substantially continuous film forming a sheath of nanoscale silicon particles is deposited on the surface of each nanotube in the form of a sheath around each nanotube;
  a positive electrode; and
  a separator placed between said negative electrode and said positive electrode,
  wherein the separator comprises a lithium-ion conductive electrolyte.

2. The lithium battery according to claim 1, in which the positive electrode comprises a material selected from the group consisting of lithiated transition metal phosphates, lithiated transition metal oxides, and mixtures thereof.

3. The lithium battery according to claim 1 in which the positive electrode comprises at least one material selected from the group consisting of $LiFe_{x_1}Mn_{1-x_1}PO_4$ with $0 \leq x_1 \leq 1$, and $LiCoO_2$, $LiNiO_2$, $LiMnO_2$, and $LiAlO_2$.

4. The lithium battery according to claim 1, in which the separator is in the form of a porous component containing a lithium-ion conductive liquid electrolyte.

5. The lithium battery according to claim 4, in which the lithium-ion conductive liquid electrolyte comprises an aprotic liquid solvent in which a lithium salt is dissolved.

6. The lithium battery according to claim 5, in which the aprotic liquid solvent is a carbonated solvent.

7. The lithium battery according to claim 6, in which the carbonated solvent is at least one selected from the group consisting of ethylene carbonate, propylene carbonate, dimethyl carbonate, and diethyl carbonate.

8. The lithium battery according to claim 5, in which the lithium salt is at least one selected from the group consisting of $LiPF_6$, $LiClO_4$, $LiBF_4$, $LiAsF_6$, $LiCF_3SO_3$, $LiN(CF_3SO_2)_3$, and $LiN(C_2F_6SO_2)$.

9. The lithium battery according to claim 1, in which the film has a thickness ranging from 1 to 50 nm.

10. The lithium battery according to claim 1, in which the carbon nanotubes are positioned substantially parallel to one another.

11. The lithium battery according to claim 1, in which the carbon nanotubes are attached to a substrate via one of their ends.

12. The lithium battery according to claim 11, in which the carbon nanotubes are positioned substantially perpendicular relative to the substrate.

13. The lithium battery according to claim 11, in which the substrate is electrically conductive.

* * * * *